Patented Oct. 2, 1928.

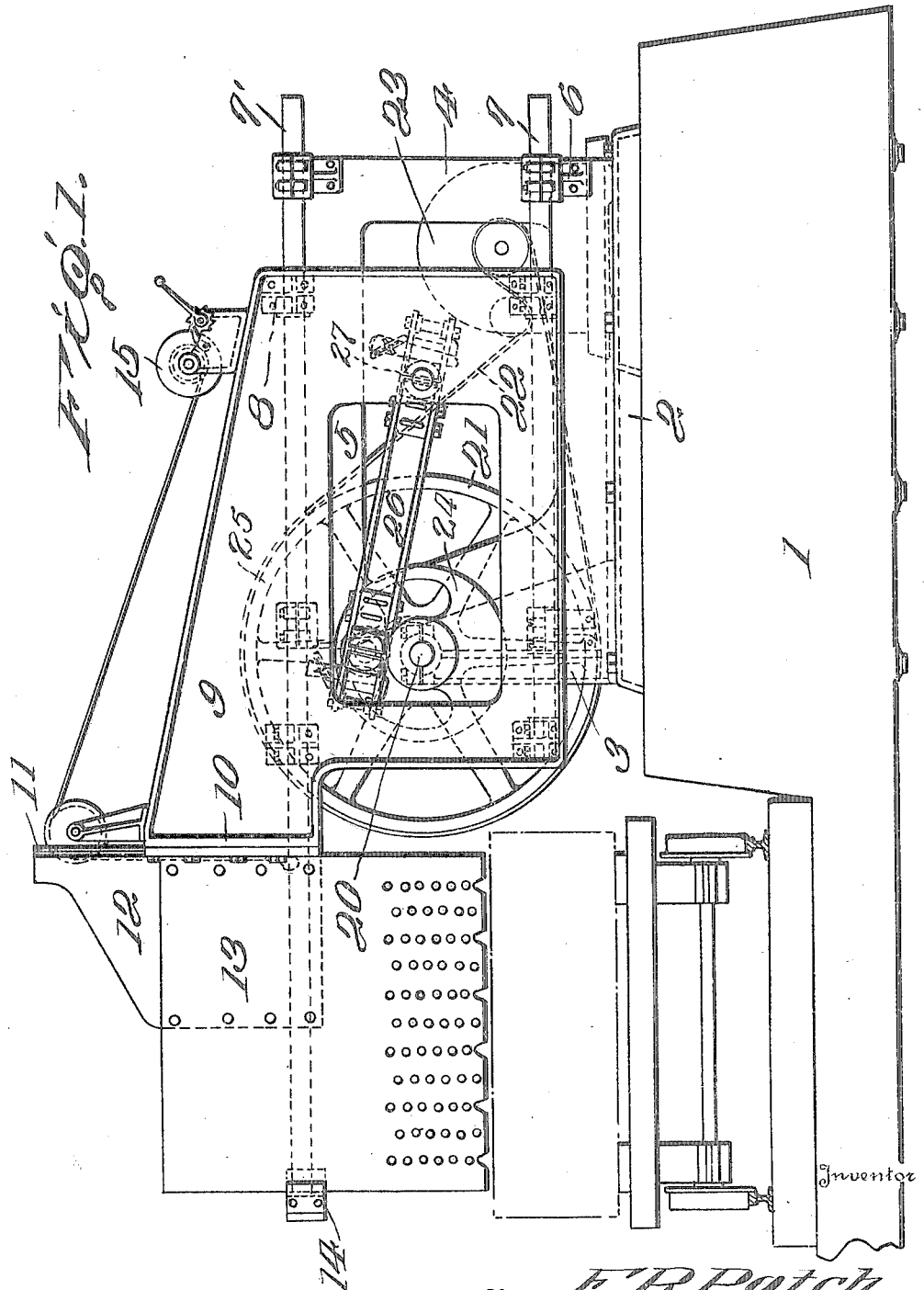

1,685,863

UNITED STATES PATENT OFFICE.

FRED R. PATCH, OF RUTLAND, VERMONT.

STONE-SAWING MACHINE.

Application filed August 5, 1925. Serial No. 48,259.

This invention relates to certain new and useful improvements in stone sawing machines and more particularly to reciprocating saw machines, the object being to provide a fast cutting stone sawing machine for rapidly jointing and cutting up granite, marble, slate or other stone.

Another object of my invention is to provide a stone sawing machine which is exceedingly simple and cheap in construction and one which is very strong and durable in use, the parts being so arranged and mounted that they are not likely to get out of order in operation, whereby stone can be rapidly sawed.

Another and further object of my invention is to provide novel means for mounting the reciprocating head and supporting the saw holder.

Other and further objects and advantages of the invention will be hereinafter set forth and the novel features thereof defined in the appended claims.

In the drawings,

Figure 1 is a side elevation of a stone sawing machine constructed in accordance with my invention; and Figure 2 is an end elevation of the same.

In carrying out my invention 1 indicates a foundation on which is mounted a cast iron base 2 which has secured thereon a substantially vertically disposed rectangular frame composed of uprights 3 and 4 connected together by a horizontally disposed bar 5.

Secured to the vertically disposed frame are brackets 6 provided with babbitted bearings in which are slidably mounted bars 7 and 7' carrying brackets 8 which are fixed to a saw head 9 so that the head can be reciprocated as will be hereinafter fully described. The head 9 is provided with a vertically disposed guideway 10 in which is mounted a tongue 11 and a holder 12 to which is fixed a saw blade 13, the outer edge of which is guided by guide 14 carried by the end of the bar 7' as clearly shown whereby the saw blade can move downwardly as the cut is made in the stone.

The holder 12 is raised and lowered by a winch 15, the free end of the cable of which is connected to the holder 12 so that the holder with the blade can be raised or can be lowered so that the saw can be placed in its proper position with respect to the stone.

Mounted on the base 2 is a stand 16 provided with a bearing 18 at its upper end. The upright 3 of the rectangular frame is provided with a bearing 19 in horizontal alignment with the bearing 18. Mounted in the bearings 18 and 19 is a crank shaft 20 carrying a pulley 21 over which is adapted to pass a belt 22 driven by an electric motor 23 or from an over-head shafting not shown, but it is, of course, understood that the particular manner of driving the crank shaft can be varied without departing from the spirit of my invention.

Fixed on the end of the crank shaft 20 is a crank wheel 24 provided with a wrist pin 25 which is connected by a pitman 26 to a wrist pin 27 carried by the saw head 9 so that as the shaft 20 is revolved, the saw head is reciprocated.

In the drawing I have shown a saw head provided with a single holder or a single blade, but it is, of course, understood that the holder can be provided with one or more supports so as to support any number of blades desired and therefore I do not wish to limit myself to the use of a saw holder constructed in any particular manner.

In the operation of a stone sawing machine as herein shown and described, when the stone is moved into position to be cut, the winch is operated so as to lower the saw blade in contact with the upper face of the stone and by starting the motor so as to revolve the crank shaft, the saw head is reciprocated so as to reciprocate the saw blade back and forth across the stone and by mounting the saw head on guide rods as shown, the saw is held in its proper position under all conditions.

From the foregoing description it will be seen that I have provided a stone sawing machine composed of very few parts, which are so arranged that the reciprocating head is carried by guide rods mounted in bearings so as to reciprocate in such a manner that a clean cut can be made.

What I claim is:—

1. A stone sawing machine comprising a base having standards, a crank shaft mounted in said standards having a crank head provided with a wrist pin, a vertically disposed frame mounted on said base provided with brackets, bearings carried by said brackets, a saw head provided with rods slidably mounted in said bearings, a wrist pin carried by said saw head, a pitman connecting the wrist pin of said saw head to the wrist pin of said crank shaft, a guide holder slidably mounted on one end of said saw head, a saw blade carried by said holder and a guide carried by one of said rods for guiding the free edge of said blade.

2. A stone sawing machine comprising a base having a vertically disposed frame mounted thereon provided with brackets, rods slidably mounted in said brackets, a saw head carried by said rod, said saw head being provided with a vertically disposed guideway at one end, a saw holder slidably mounted in said guideway, means for adjusting said saw holder in said guideway, a saw blade carried by said saw holder, a guide member carried by one of said rods for guiding the free end of said saw blade and means for reciprocating said saw head.

3. A reciprocating stone sawing machine comprising a base provided with a vertically disposed frame, superposed brackets carried by said frame provided with bearings, rods slidably mounted in said bearings, brackets fixed on said rods, a saw head fixed to said brackets having a guideway at one end, a saw holder slidably mounted in said guideway, a saw blade carried by said holder, means for adjusting said holder in said guideway, means for reciprocating said saw head and a guideway carried by one of said rods for guiding the free end of said saw blade.

4. A reciprocating stone sawing machine comprising a base, a frame mounted on said base provided with bearings, rods slidably mounted in said bearings, a saw head carried by said rods, a crank shaft mounted on said base provided with a wrist pin, a wrist pin carried by said saw head, a pitman connecting said wrist pins, a pulley carried by said crank shaft, an electric motor for driving said pulley, a guideway carried by said saw head, a saw holder slidably mounted in said guideway, a winch for raising and lowering said saw holder in said guideway and a saw blade carried by said saw holder having means for guiding the free edge thereof.

In testimony whereof I hereunto affix my signature.

FRED R. PATCH.